United States Patent [19]
Alvarado

[11] Patent Number: 5,172,789
[45] Date of Patent: Dec. 22, 1992

[54] DOOR LOCK FOR VEHICLE WITH SEAT BELT SYSTEM

[76] Inventor: Alfredo Alvarado, 4310 Bayview Dr., Fort Lauderdale, Fla. 33308

[21] Appl. No.: 795,824

[22] Filed: Nov. 21, 1991

Related U.S. Application Data

[63] Continuation-in-part of Ser. No. 682,357, Apr. 9, 1991.

[51] Int. Cl.⁵ ............................................. B60R 22/06
[52] U.S. Cl. ..................................... 180/268; 280/804
[58] Field of Search ............... 280/804, 802, 801, 808; 180/268, 286

[56] References Cited

U.S. PATENT DOCUMENTS

| | | | |
|---|---|---|---|
| 3,219,361 | 11/1965 | Brown | 180/268 |
| 3,583,726 | 6/1971 | Lindblad | 280/805 |
| 3,788,685 | 1/1974 | Leichtl | 180/286 |
| 3,927,902 | 12/1975 | Lindblad | 280/804 |
| 4,189,170 | 2/1980 | Tanka | 280/802 |
| 4,256,330 | 3/1981 | Geoffrey | 280/802 |
| 4,313,622 | 2/1982 | Susuki | 280/804 |
| 4,364,584 | 12/1982 | Rogeres et al. | 280/802 |
| 4,483,553 | 11/1984 | Nogiwa | 280/804 |
| 4,486,031 | 12/1984 | Holler et al. | 280/802 |
| 4,722,552 | 2/1988 | Gyoda et al. | 280/802 |
| 4,730,844 | 3/1988 | Patterson | 280/804 |
| 4,781,267 | 11/1988 | Waineo et al. | 180/268 |

FOREIGN PATENT DOCUMENTS 164538 12/1980 Japan .................................. 180/268

OTHER PUBLICATIONS

"AAA World", Jan./Feb. 1989, pp. 10 and 11.

Primary Examiner—Karin L. Tyson
Attorney, Agent, or Firm—Oltman and Flynn

[57] ABSTRACT

This is a door lock arrangement which is operated by a slide on a vehicle door, which slide is the actuator of a seat belt system for a seat next to the door. As the door is closed, the slide moves along the door to operate this door lock as well as to put the seat belt system in its operating position restraining a person who is sitting on this seat. The door lock includes a socketed keeper mounted on a door post behind the door, a holder mounted on the door, a lock bolt slidable in this holder and engageable in the socket of the keeper, and a spring biasing the lock bolt out of engagement with the keeper and into the path of movement of the slide as the door is closing.

2 Claims, 3 Drawing Sheets

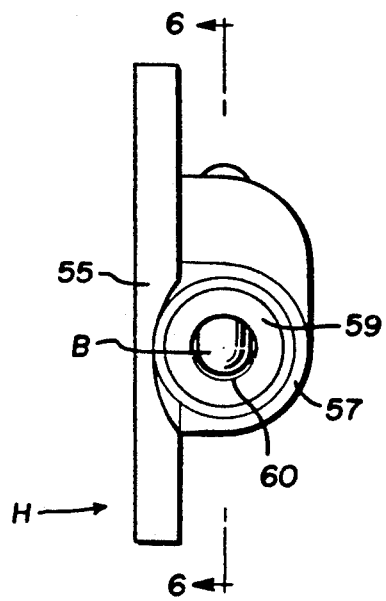
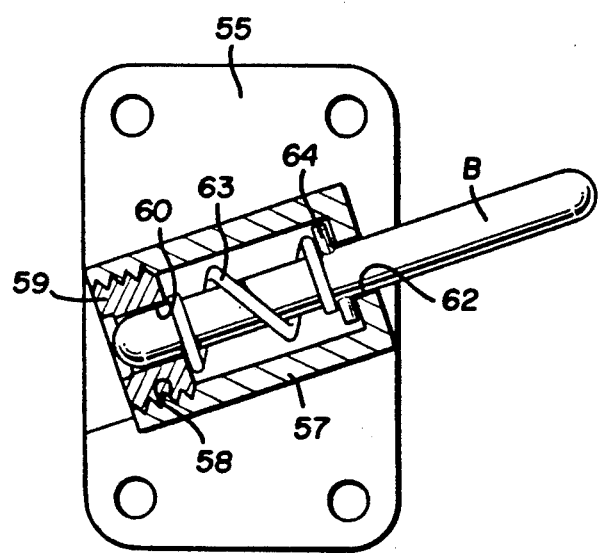
FIG. 5  FIG. 6
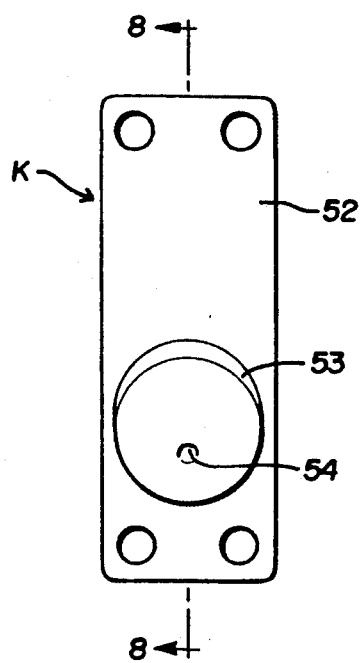
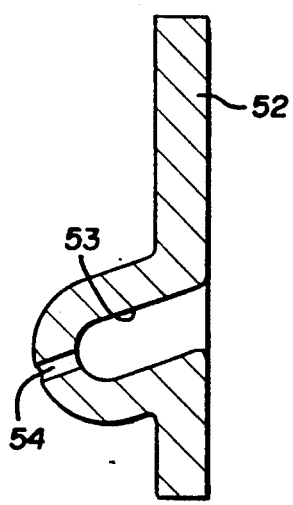
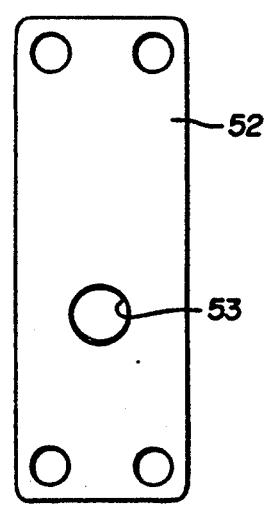
FIG. 7  FIG. 8  FIG. 9

DOOR LOCK FOR VEHICLE WITH SEAT BELT SYSTEM

RELATED APPLICATION

This application is a continuation in part of copending U.S. patent application Ser. No. 07/682,357 filed Apr. 9, 1991.

This invention relates to an automatic door lock in a motor vehicle equipped with a seat belt system having an actuator movable along a door of the vehicle adjacent the seat whose occupant is restrained by the seat belt system.

BACKGROUND OF THE INVENTION

My U.S. patent application Ser. No. 07/682,357 filed Apr. 9, 1991, discloses a seat belt system for a motor vehicle having a belt with shoulder and lap segments that move automatically into engagement respectively with the upper torso and lap of a person who has entered and sat down in the vehicle. The shoulder and lap segments of the belt move out of the person's way when the adjacent vehicle door is opened. The seat belt system has a slide for operating the belt which is slidable along an inclined guideway on the door.

Other seat belt systems for the same general purpose are shown in prior U.S. patents and publications discussed in the Prior Art Statement filed as part of the present patent application.

SUMMARY OF THE INVENTION

The present invention relates to an automatic vehicle door lock which operates in conjunction with such seat belt systems to keep the door locked when the belt is in its operating position restraining a person sitting on the seat.

Preferably, the present invention is a vehicle door lock which comprises a keeper mounted on an adjacent door post and a reciprocable plunger in a holder mounted on the vehicle door in position to be pushed into the keeper by a seat belt actuator slide on the door as the door is closed. The plunger is spring-biased toward the slide and is disengaged from the keeper when the door is open.

A principal object of this invention is to provide a vehicle door lock arrangement which is associated in a novel manner with a seat belt system in the vehicle to keep the door locked closed when the seat belt system is in its operating position restraining a person sitting on the seat.

Another object of this invention is to provide such a vehicle door lock arrangement which locks the door automatically as the door is closed.

Further objects and advantages of this invention will be apparent from the following detailed description of a presently preferred embodiment which is illustrated schematically in the accompanying drawings.

DESCRIPTION OF THE DRAWINGS

FIG. 5 is an end elevation of the lock bolt and its door-mounted holder in the door lock shown in FIGS. 2, 3 and 4;

FIG. 6 is a view taken along the line 6—6 in FIG. 5;

FIG. 7 is an end elevation of the keeper in this door lock;

FIG. 8 is a section taken along the line 8—8 in FIG. 7; and

FIG. 9 is an end elevation of this keeper, viewed from the right end of FIG. 8.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Figure 1:
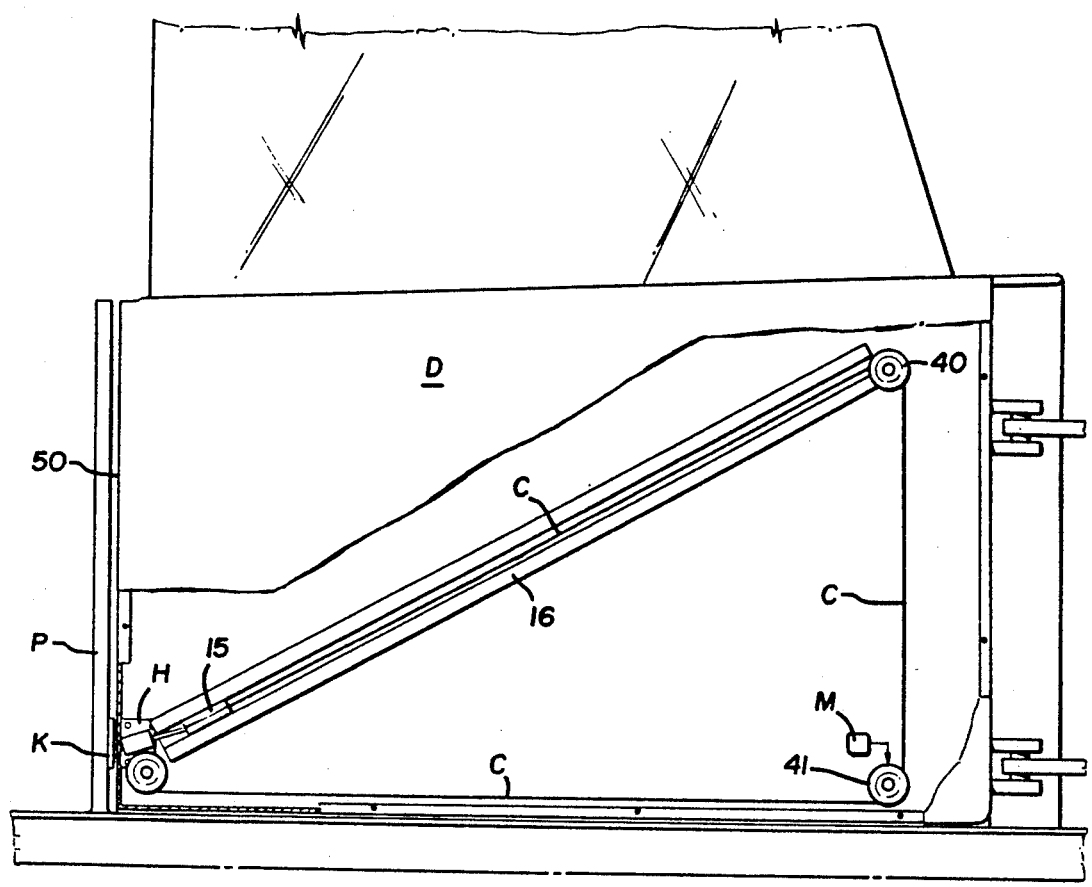
FIG. 1 is an elevational view, partly broken away, of the inboard side of a vehicle door equipped with a door lock in accordance with the present invention.
Figure 2:
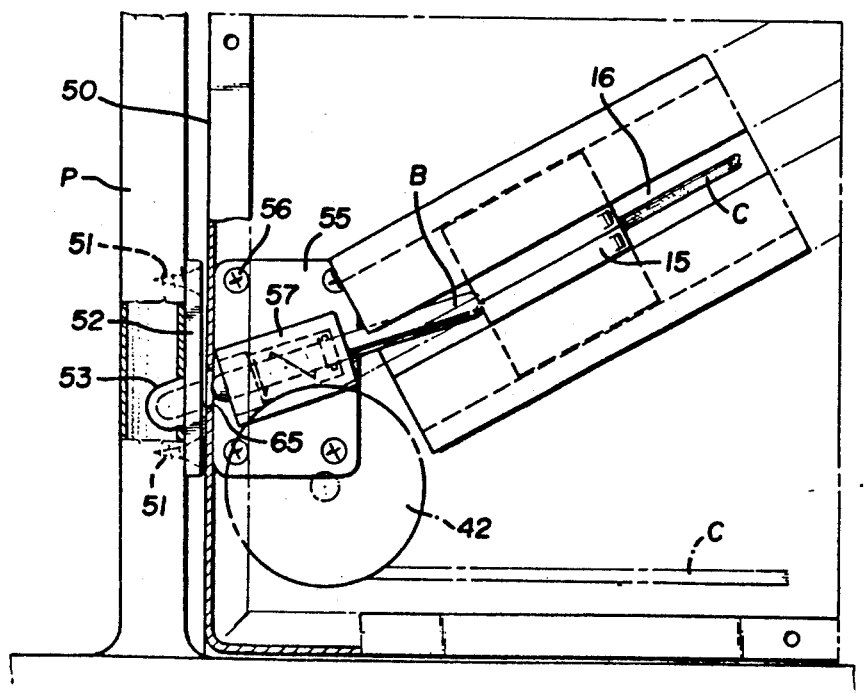
FIG. 2 is a similar view showing the door lock and the door-mounted slide for actuating it which is part of a seat belt system for the seat next to the door.
Figure 3:
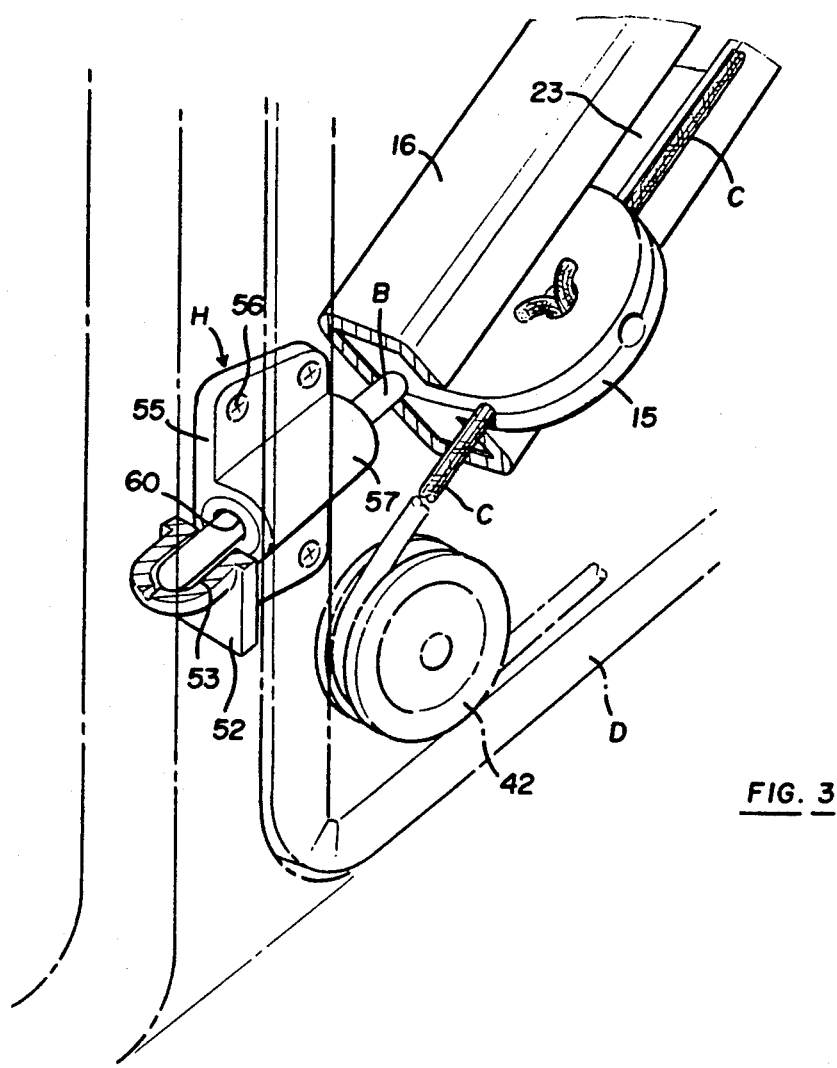
FIG. 3 is a perspective view showing the slide in its lowermost, rearmost position on the door, holding the lock closed.

FIG. 1 shows the door D next to the driver's seat of a motor vehicle equipped with a passive seat belt system as disclosed in my U.S. patent application Ser. No. 07/682,357, filed Apr. 9, 1991. This seat belt system includes an elongated guideway 16 on the inside of this door next to the driver's seat. The door D is vertically hinged at the front in the usual manner. Guideway 16 is inclined upward and forward on the door. The seat belt system also includes an actuator in the form of a slide 15 which is slidable along guideway 16 between a retracted lower position near the lower end of the guideway, as shown in FIGS. 1 and 2 and an extended upper position near the upper end of guideway 16. As best seen in FIG. 3, guideway 16 is an elongated channel of rectangular cross-section mounted in the door D and presenting an elongated slot 23 which is open along the inner side of the door. This channel is open at its lower end. A flexible cable C extends along the inside of the guideway channel upward and forward from slide 15 to an upper front pulley 40 in the door, then vertically down to a lower front pulley 41 in the door, then horizontally rearward to a rear pulley 42, and from the rear pulley forward and upward to slide 15.

As disclosed in my aforementioned patent application, slide 15 carries a slip ring (not shown) which slidably engages the seat belt (not shown) and determines the position of the shoulder and lap segments of the belt in accordance with the position of door D.

When the door is open, slide 15 and the slip ring connected to it are positioned near the upper front end of guideway 16, and the slip ring holds the shoulder and lap segments of the seat belt up and away from a person who is sitting on the seat next to door D or is entering the vehicle at this door. This is the release position of the seat belt system.

When the door is closed, slide 15 and the slip ring are positioned at the lower back end of guideway 16, and the slip ring holds the shoulder and lap segments of the seat belt against the upper torso and lap of a person sitting on the seat next to door D. This is the operating position of the seat belt system.

As shown in FIGS. 1 and 2, the vehicle has a vertical door post P located closely behind the rear edge 50 of door D when the door is closed. Fastened to the front edge of this door post, such as by screws 51 (FIG. 2), is the keeper K which is one part of an auxiliary lock for this door. As shown in FIGS. 7, 8 and 9, keeper K has a flat mounting plate 52 and an integral socket 53. Socket 53 is open at the front side of the keeper and is inclined rearward and downward from it. Socket 53 has a small air vent 54 at its back end.

The other part of the door lock is mounted on door D. As shown in FIGS. 5 and 6, this part comprises a holder H having a generally flat plate 55 which is fastened inside the door D, such as by screws 56, as shown in FIG. 2, and a tubular segment 57 formed integral with plate 55 and projecting from it toward the laterally inboard side of the door, as best seen in FIG. 3. The tubular segment 57 of holder H is inclined upward and forward in line with the inclined keeper socket 53 when the door is closed. As shown in FIG. 6, tubular segment 57 has a screw-threaded opening 58 at its lower end which threadedly receives an externally screw-threaded, annular end piece 59 formed with a counter-bored opening 60 of circular cross-section. Tubular segment 57 has a transverse end wall 61 at its upper end which is formed with a cylindrical opening 62 that is coaxial with the opening 60 in the lower end piece 59. The conjoint axis of these openings 60 and 62 in the holder is coaxial with the keeper socket 53 when the door is closed.

Figure 4:
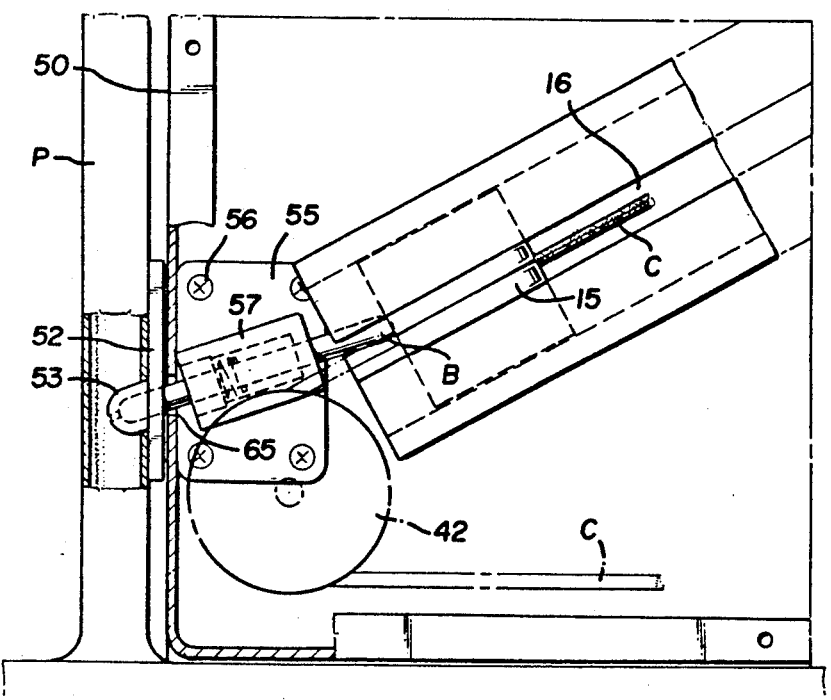
FIG. 4 is an elevational view of the parts shown in FIG. 3 when the slide is moving downward and rearward but has not reached the FIG. 3 position.

A plunger or bolt B of solid cylindrical cross-section is mounted in the holder H with its lower end slidably received in the end piece opening 60. The bolt extends slidably through the upper end opening 62 in the holder and into the lower end of the door-mounted guideway 16, as shown in FIGS. 2, 3 and 4, in the path of slide 15 as it moves downward and rearward along this guideway. As shown in FIG. 6, a coil spring 63 is positioned inside the tubular segment 57 of holder H, extending loosely around bolt B and engaged under compression between the lower end piece 59 of the holder and an annular plate 64 rigidly attached to bolt B and extending transverse to it.

Normally, spring 63 biases the lock bolt B to the position shown in FIGS. 6 and 2. In this normal position of the lock bolt, its lower end is immediately in front of an opening 65 in the rear edge 50 of door D. Therefore, in this normal position of the bolt it does not engage the keeper socket 53 and this lock is open, permitting the door to be opened and closed. The lock bolt is in this position except when slide 15 of the seat belt system is at or very near the lower end of guideway 16.

A short time after a person enters the vehicle through door D, sits on the seat next to this door and closes the door to actuate the passive seat belt system, the slide 15 of the seat belt system moves down along the door-mounted guideway 16, as shown in FIG. 4, and pushes lock belt B downward and rearward (against the bias of spring 63) toward the keeper socket 53. Continued movement of slide 15 in this direction causes the lower end of the lock bolt to be fully received in the keeper socket, as shown in FIG. 3, locking the door closed and holding it closed as long as the seat belt system remains in its operative position, with the shoulder and lap segments of the belt engaging the upper torso and lap of a person sitting on the seat next to door D and with slide D in its lowermost, rearmost position along the door-mounted guideway 16.

From the foregoing description taken in conjunction with the accompanying drawings, it will be evident that the illustrated embodiment of this invention provides an additional safety feature on a motor vehicle which insures that the door cannot open accidentally while a person is on the adjacent seat with the seat belt system in its operative position, restraining the person in the well known manner.

While a particular, presently preferred structural embodiment of the invention has been disclosed in detail, it is to be understood that the invention is susceptible of other embodiments of the door lock itself and the seat belt system which operates it automatically.

I claim:

1. In a motor vehicle having:
   a front-hinged door for access to the interior of the vehicle;
   a door post behind said door;
   a seat next to said door;
   and a seat belt system having a release position enabling a person to enter upon and leave said seat and an operating position restraining a person sitting on said seat, said seat belt system including an elongated, upwardly and forwardly inclined guideway on said door, and a slide which is slidable along said guideway between an upper position which establishes said release position of said seat belt system and a lower position which establishes said operating position of said seat belt system;
   the improvement which comprises an auxiliary lock for said door having;
   a keeper mounted on said door post and presenting an upwardly and forwardly inclined socket which is aligned with said guideway when said door is closed, said socket being open at its upper front end;
   a holder mounted on said door;
   a lock bolt slidably mounted in said holder behind said guideway and projecting upward and forward from said holder into the path of movement of said slide downward and rearward along said guideway, said lock bolt having a rear end segment which is engageable in said socket when said lock bolt is moved rearward and downward by said slide in the movement of said slide to its said lower position thereof;
   and spring means in said holder biasing said lock bolt forwardly and upwardly to a position disengaging said rear end segment of the lock bolt from said socket in the keeper.

2. In a motor vehicle having:
   a front-hinged door for access to the interior of the vehicle;
   a door post behind said door;
   a seat next to said door;
   and a seat belt system having a release position enabling a person to enter upon and leave said seat and an operating position restraining a person sitting on said seat, said seat belt system including an elongated, upwardly and forwardly inclined guideway on said door, and a slide which is slidable along said guideway between an upper position which establishes said release position of said seat belt system and a lower position which establishes said operating position of said seat belt system;
   the improvement which comprises an auxiliary lock for said door having;
   a holder mounted on said door;

a keeper mounted on said door post and presenting a forwardly opening socket which is aligned with said guideway when said door is closed;

a lock bolt slidably mounted in said holder and projecting from said holder into the path of movement of said slide downward and rearward along said guideway, said lock bolt having a rear end segment which is engageable in said socket when said lock bolt is moved by the downward and rearward movement of said slide;

and spring means in said holder biasing said lock bolt forwardly and upwardly to a position disengaging said rear end segment of the lock bolt from said socket in said keeper.

* * * * *